(12) United States Patent
Watanabe et al.

(10) Patent No.: US 11,321,409 B2
(45) Date of Patent: May 3, 2022

(54) PERFORMING A SEARCH BASED ON POSITION INFORMATION

(71) Applicant: INTERNATIONAL BUSINESS MACHINES CORPORATION, Armonk, NY (US)

(72) Inventors: Kenta Watanabe, Soka (JP); Shunsuke Ishikawa, Shinjuku (JP); Asako Ono, Setagaya (JP); Hiroaki Uetsuki, Machida (JP); Yasuyuki Tominaga, Saitama (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 16/748,609

(22) Filed: Jan. 21, 2020

(65) Prior Publication Data
US 2021/0224344 A1 Jul. 22, 2021

(51) Int. Cl.
*G06F 16/9537* (2019.01)
*G06F 16/9535* (2019.01)
(Continued)

(52) U.S. Cl.
CPC ...... *G06F 16/9535* (2019.01); *G06F 16/9537* (2019.01); *G06F 16/9538* (2019.01); *G06V 20/63* (2022.01); *G06V 30/414* (2022.01)

(58) Field of Classification Search
CPC ............. G06F 16/9535; G06F 16/9537; G06F 16/9538; G06V 20/63
See application file for complete search history.

(56) References Cited

U.S. PATENT DOCUMENTS 9,563,818 B2 2/2017 Hwang et al.
10,216,762 B2 2/2019 Kozuka et al.
(Continued)

FOREIGN PATENT DOCUMENTS

| CN | 104766082 A | 8/2018 |
| JP | H0264868 | 3/1990 |
| JP | 2019087272 | 6/2019 |

OTHER PUBLICATIONS

U.S. Pat. No. 10,216,762B2, dated Feb. 26, 2019, is an English Language Equivalent of JP Publication No. 2019087272, dated Jun. 6, 2019.

(Continued)

*Primary Examiner* — Kris E Mackes
(74) *Attorney, Agent, or Firm* — Konrad Raynes Davda & Victor LLP; Janaki K. Davda

(57) ABSTRACT

Provided are techniques for performing a search based on position information. A search request that provides location information for a region of a screen image is received. A selection of a type indicator is received, where the type indicator indicates one of a text item and an image. In response to the type indicator indicating the text item, one or more of the text item and a date and time are received. A search is performed using the location information and the one or more of the text item and the date and time to identify one or more screen image identifiers of one or more corresponding screen images of a plurality of screen images. The one or more screen image identifiers are used to retrieve the one or more corresponding screen images. The one or more corresponding screen images are displayed as search results.

24 Claims, 15 Drawing Sheets

(51) Int. Cl.
*G06F 16/9538* (2019.01)
*G06V 20/62* (2022.01)
*G06V 30/414* (2022.01)

(56) References Cited

U.S. PATENT DOCUMENTS

| | | | |
|---|---|---|---|
| 10,244,369 B1 | 3/2019 | Sharifi et al. | |
| 10,963,529 B1 * | 3/2021 | Amitay | G06Q 50/01 |
| 2009/0010491 A1 * | 1/2009 | Ko | G06F 16/58 |
| | | | 382/103 |
| 2009/0172526 A1 | 7/2009 | Sorenson | |
| 2012/0054168 A1 | 3/2012 | Chung et al. | |
| 2013/0182182 A1 * | 7/2013 | Mountain | H04N 21/44008 |
| | | | 348/E5.103 |
| 2013/0311508 A1 * | 11/2013 | Denker | G06F 3/013 |
| | | | 707/769 |
| 2015/0169766 A1 * | 6/2015 | Sugihara | G06F 3/0488 |
| | | | 707/722 |
| 2016/0350333 A1 | 12/2016 | Sacheti et al. | |
| 2017/0215025 A1 | 7/2017 | Raman et al. | |
| 2019/0121879 A1 | 4/2019 | Canelis et al. | |
| 2019/0146649 A1 | 5/2019 | Satou et al. | |
| 2019/0205005 A1 | 7/2019 | Sharifi et al. | |

OTHER PUBLICATIONS

Abstract and Machine Translation for JPH0264868, published Mar. 5, 1990, Total 5 pages.
Mell et al., "Effectively and Securely Using the Cloud Computing Paradigm" dated Oct. 7, 2009, NIST, Information Technology Laboratory, Total 80 pages.
Mell et al., "The NIST Definition of Cloud Computing" dated Sep. 2011, Recommendations of the National Institute of Standards and Technology, Total 7 pages.
Wikipedia, "Method of Loci", [online], last edited Nov. 30, 2019, [Retrieved on Dec. 2, 2019], Retrieved from the Internet at <URL: https://en.wikipedia.org/wiki/Method_of_loci>, 7 pp.
Wikipedia, "Mnemonic", [online], last edited Jan. 5, 2020, [Retrieved on Jan. 13, 2020], Retrieved from the Internet at <URL: https://en.wikipedia.org/wiki/Mnemonic>, 11 pp.
International Search Report and Written Opinion for International Application No. PCT/IB2021/050376, 10 pp., dated Apr. 26, 2021. [57.473CN (ISR & WO)].

* cited by examiner

| Text Item 210 | Coordinates Left-Top Position 220 | Coordinates Right-Bottom Position 230 | Date and Time 240 | Screen Image Identifier 250 |
|---|---|---|---|---|
| ... | ... | ... | ... | ... |

| Image Identifier 310 | Coordinates Left-Top Position 320 | Coordinates Right-Bottom Position 330 | Image Classification 340 | Date and Time 350 | Screen Image Identifier 360 |
|---|---|---|---|---|---|
| ... | ... | ... | ... | ... | ... |

| Record Identifier 410 | Type Indicator 420 (Text Item or Image with Image Classification) | Value 430 (Text Item or Image Identifier) | Coordinates Left-Top Position 440 | Coordinates Right-Bottom Position 450 | Date and Time 460 | Screen Image Identifier 470 |
|---|---|---|---|---|---|---|
| 0 | Text Item Indicator | Text Item | ... | ... | ... | ... |
| 1 | Image Indicator and Image Classification | Image Identifier | ... | ... | ... | ... |
| ... | ... | ... | ... | ... | ... | ... |

FIG. 4

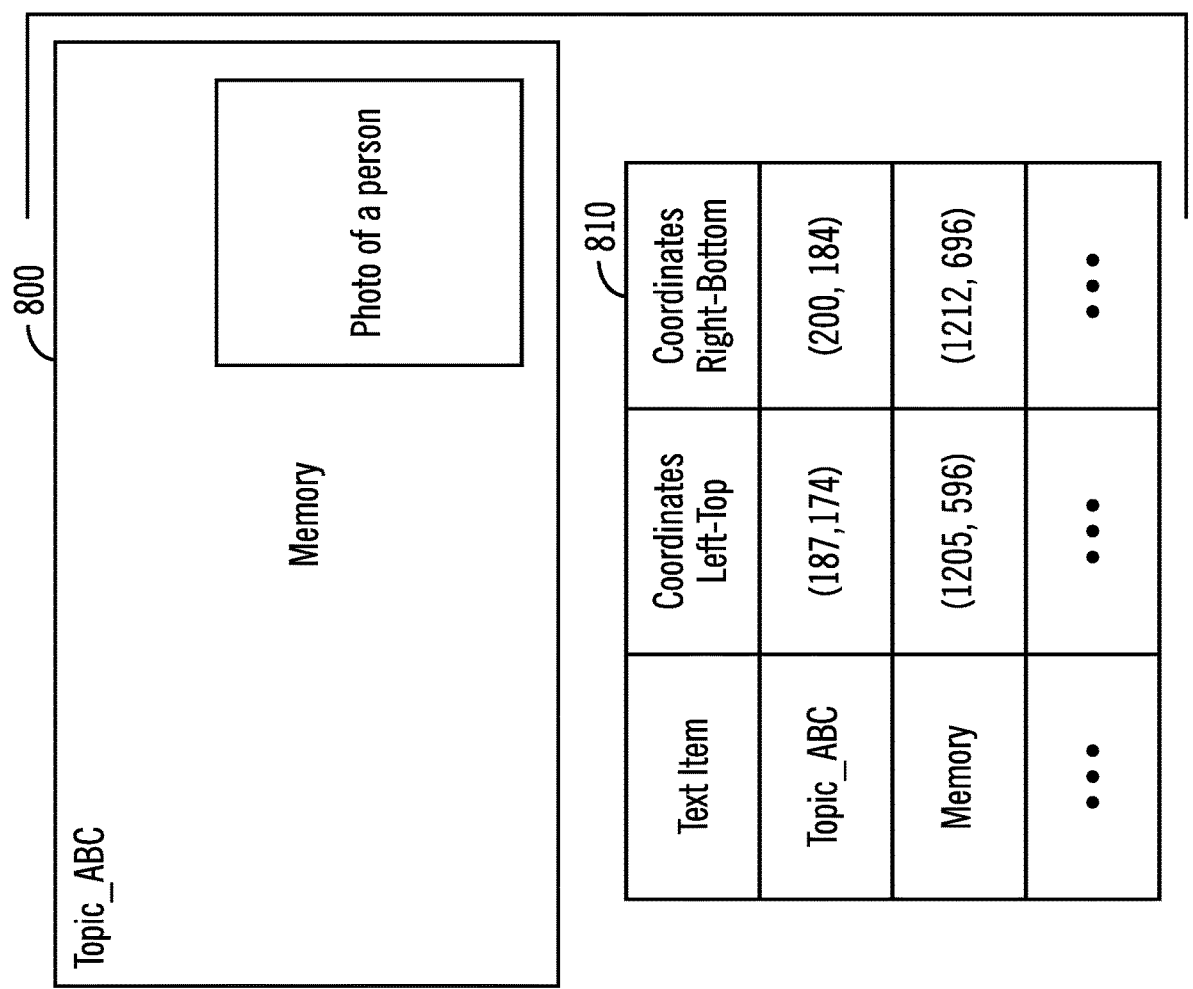

| Row Identifier | Type Indicator (Text Item or Image with Image Classification) | Value 430 (Text Item or Image Identifier) | Coordinates Left-Top | Coordinates Right-Bottom | Date and Time | Screen Image Identifier |
|---|---|---|---|---|---|---|
| 0 | Text Item | Topic_ABC | (187,174) | (200, 184) | xxx | SS-0001 |
| 1 | Text Item | Memory | (1205, 596) | (1212, 696) | xxx | SS-0001 |
| 2 | Image with Image Classification of Person | Image Identifier | (1300, 400) | (1420, 800) | xxx | SS-0001 |

— 830

| Image Classification | Coordinates Left-Top | Coordinates Right-Bottom |
|---|---|---|
| Person | (1300, 400) | (1420, 800) |

PERFORMING A SEARCH BASED ON POSITION INFORMATION

BACKGROUND

Embodiments of the invention relate to performing a search based on position information.

A user may sometimes memorize a subject (e.g., a topic, a photo, etc.) by associating that subject with a location. For example, when reading a document on the screen of a computer (e.g., a personal computer or a smartphone), the user may remember that certain information about a topic was at the upper right of the screen.

The user may also memorize a subject relative to ambient information (e.g., relative to images) rather than using an absolute location (e.g., coordinates) of the screen. For example, the user may remember seeing an article about the topic at the left of a newspaper page on which there was a photo at the lower right of the page.

Then, with a conventional search system, the user specifies a certain word or meta information to perform a search.

SUMMARY

In accordance with certain embodiments, a computer-implemented method is provided for performing a search based on position information. The computer-implemented method comprises operations. A search request that provides location information for a region of a screen image is received. A selection of a type indicator is received, where the type indicator indicates one of a text item and an image. In response to the type indicator indicating the text item, one or more of the text item and a date and time are received. A search is performed using the location information and the one or more of the text item and the date and time to identify one or more screen image identifiers of one or more corresponding screen images of a plurality of screen images. The one or more screen image identifiers are used to retrieve the one or more corresponding screen images. The one or more corresponding screen images are displayed as search results.

In accordance with other embodiments, a computer program product is provided for performing a search based on position information. The computer program product comprises a computer readable storage medium having program code embodied therewith, the program code executable by at least one processor to perform operations. A search request that provides location information for a region of a screen image is received. A selection of a type indicator is received, where the type indicator indicates one of a text item and an image. In response to the type indicator indicating the text item, one or more of the text item and a date and time are received. A search is performed using the location information and the one or more of the text item and the date and time to identify one or more screen image identifiers of one or more corresponding screen images of a plurality of screen images. The one or more screen image identifiers are used to retrieve the one or more corresponding screen images. The one or more corresponding screen images are displayed as search results.

In accordance with yet other embodiments, a computer system is provided for performing a search based on position information. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A search request that provides location information for a region of a screen image is received. A selection of a type indicator is received, where the type indicator indicates one of a text item and an image. In response to the type indicator indicating the text item, one or more of the text item and a date and time are received. A search is performed using the location information and the one or more of the text item and the date and time to identify one or more screen image identifiers of one or more corresponding screen images of a plurality of screen images. The one or more screen image identifiers are used to retrieve the one or more corresponding screen images. The one or more corresponding screen images are displayed as search results.

BRIEF DESCRIPTION OF THE SEVERAL VIEWS OF THE DRAWINGS

Referring now to the drawings in which like reference numbers represent corresponding parts throughout:

FIG. 2 illustrates example columns of a table in a text items with position information database in accordance with certain embodiments.

FIG. 3 illustrates example columns of a table in an images with position information database in accordance with certain embodiments.

FIG. 4 illustrates example columns of a table in a position information database in accordance with certain embodiments.

FIGS. 8A and 8B illustrate an example of storing position information for text items and an image in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments store text items (e.g., character strings representing words and/or phrases) and images displayed on the screen of a computer (e.g., an electronic terminal, a personal computer, a smartphone, etc.) along with location information of the text and images on the screen to enable the use of the location information for information search. In this manner, embodiments allow a user to request a search using position information on the screen as memorized by the user. In certain embodiments, the location information specifies coordinates. In certain embodiments, the coordinates are for a top-left position (X1, Y1) and for a bottom-right position (X2, Y2).

Figure 1:
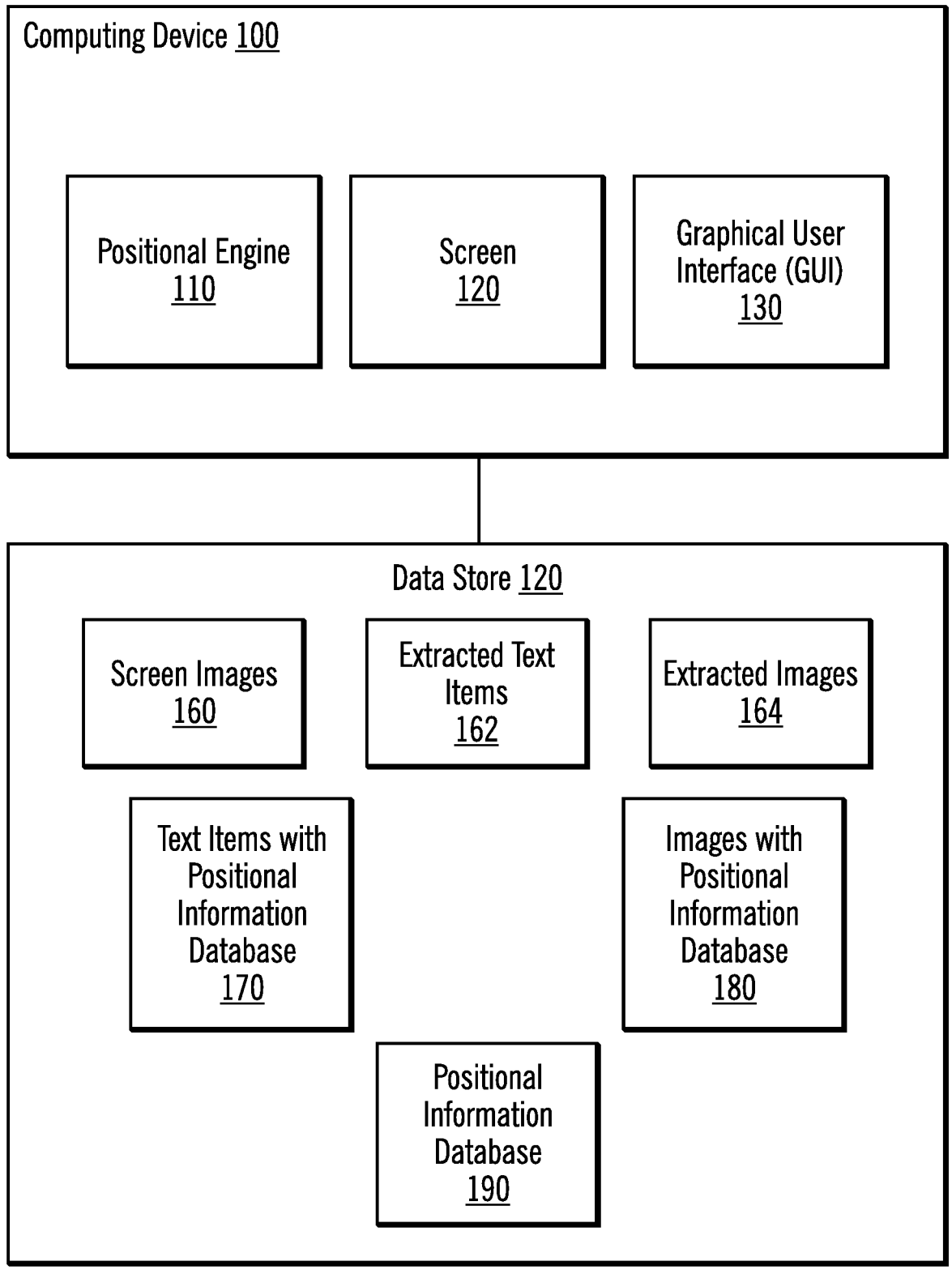
FIG. 1 illustrates, in a block diagram, a computing environment in accordance with certain embodiments.

FIG. 1 illustrates, in a block diagram, a computing environment in accordance with certain embodiments. A computing device 100 includes a positional engine 110, a screen 120 for displaying text items and images, and a Graphical User Interface (GUI) for receiving input for a search using position information and displaying the results of the search. The computing device 100 is connected to a data store 150.

The data store 150 includes screen images 160, extracted text items 162 that are extracted from each of the screen images, extracted images 164 that are extracted from each of the screen images, a text items with position information database 170, an images with position information database 180, and a position information database 190.

In certain embodiments, the computing device 100 is an electronic terminal, a personal computer, a smartphone, etc. and has a screen on which text and images are displayed. In certain embodiments, the position information database 190 includes the position information for text items and images. In certain embodiments, the text items with position information database 170 and the images with position information database 180 are optional.

The positional engine 110 obtains a screen image of the screen 120. For example, the screen image may be a screen shot of story displayed in a web page. The positional engine 110 identifies each of the text items and coordinates at which the text item is located on the screen image, which reflects the coordinates at which the text item is located on the screen 120. The positional engine 110 may use optical character recognition, web page crawling or other techniques to identify the text items. The positional engine 110 stores each of the text items with the coordinates of that text item as metadata in the data store 150. The positional engine 110 identifies images (e.g., photos, figures, etc.) and coordinates at which each of the images is located on the screen image, which reflects the coordinates at which the image is located on the screen 120. The positional engine 110 classifies the images (e.g., using a pre-trained model for the classification). The positional engine 110 stores each of the images with the image classification for that image and the coordinates of that image as metadata in the data store 150.

FIG. 2 illustrates example columns of a table 200 in a text items with position information database 170 in accordance with certain embodiments. In FIG. 2, the table 200 includes columns for a text item 210 (e.g., a word or phrase), coordinates for a left-top position 220, coordinates for a bottom-right position 230, a date and time 240, and a screen image identifier 250 (that identifies the screen image of the text item). The date and time may be described as metadata for the stored image and may be used in a search request.

FIG. 3 illustrates example columns of a table 300 in an images with position information database 180 in accordance with certain embodiments. In FIG. 3, the table 300 includes columns for an image identifier 310 of the image, coordinates for a left-top position 320, coordinates for a bottom-right position 330, an image classification 340, a date and time 350, and a screen image identifier 360. In certain embodiments, the image identifier 310 is used to retrieve the image from the extracted images 164.

FIG. 4 illustrates example columns of a table 400 a position information database 190 in accordance with certain embodiments. In FIG. 4, the table 400 includes columns for a record identifier 410, a type indicator 420 (which indicates whether the record is for a text item or for an image, and, for an image, provides the image classification), a value 430 (which provides the text item for a text item type and provides an image identifier for an image type), coordinates for a left-top position 440, coordinates for a bottom-right position 450, a date and time 460, and a screen image identifier 470.

In certain embodiments, the tables 200, 300 in the respective databases 170, 180 are merged to generate the table 400 in the database 190. In other embodiments, data is stored into the table 400 in database 190, without creating the respective databases 170, 180.

Figure 5:
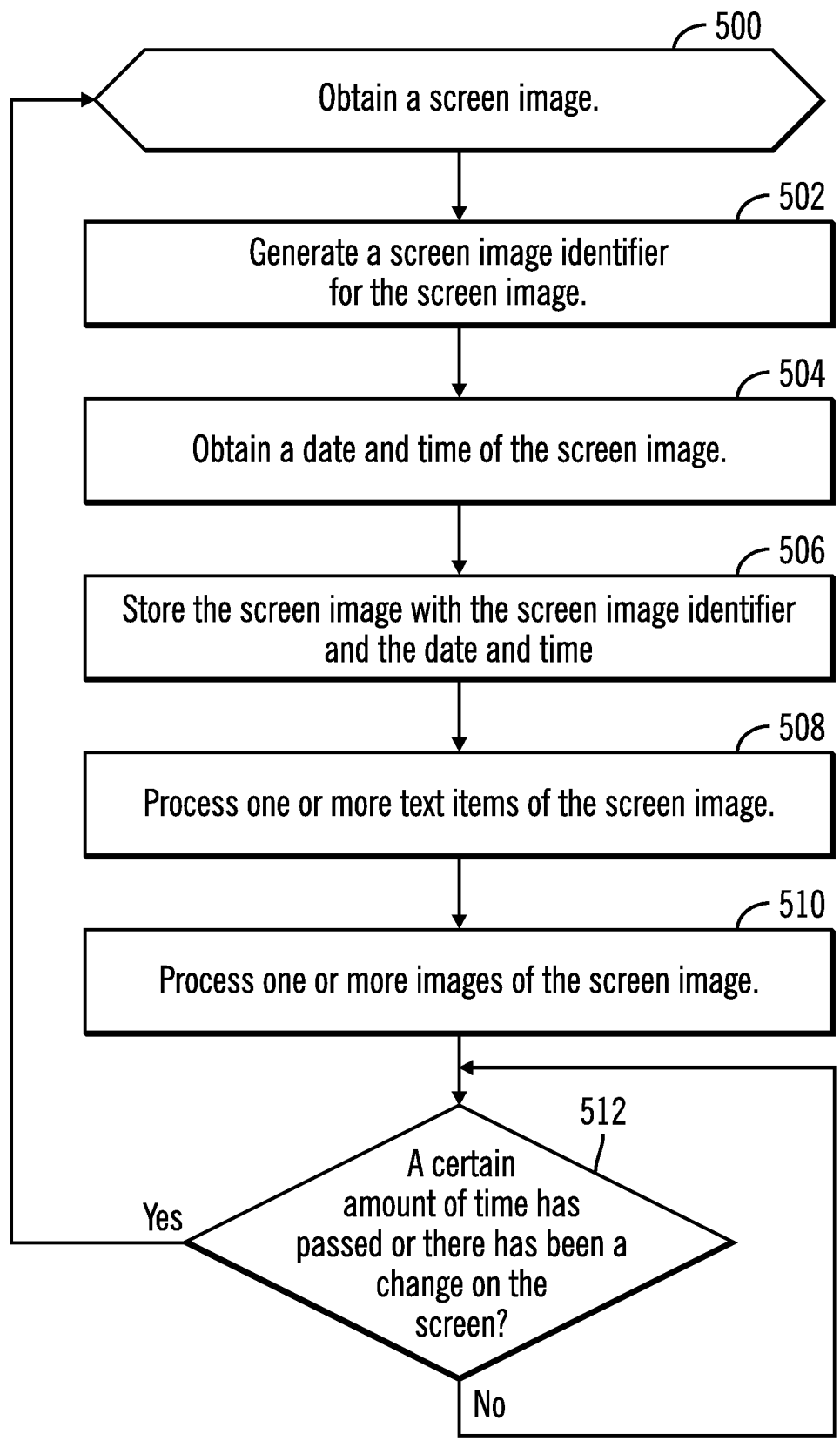
FIG. 5 illustrates, in a flowchart, operations for processing screen images in accordance with certain embodiments.

FIG. 5 illustrates, in a flowchart, operations for processing screen images in accordance with certain embodiments. Control begins at block 500 with the positional engine 110 obtaining a screen image from a screen of a computing device. In block 502, the positional engine 110 generates a screen image identifier for the screen image. In certain embodiments, the screen image identifier is unique. In other embodiments, a group of related screen images may have the same screen image identifier, but the screen image identifier along with a date and time uniquely identify each of the screen images in the group. In block 504, the positional engine 110 obtains a date and time for the screen image. The date and time indicate when the screen image was obtained. In block 506, the positional engine 110 stores the screen image with the screen image identifier and the date and time. In block 508, the positional engine 110 processes one or more text items of the screen image. In block 510, the positional engine 110 processes one or more images of the screen image. In block 512, the positional engine 110 determines whether a pre-determined amount of time has passed or there has been a change on the screen. If so, processing continues to block 500, otherwise, processing continues to block 512 to check again. In certain embodiments, instead of looping back to block 512 to check again, the positional engine 110 waits for some period of time before continuing to block 512 to check again. The pre-determined amount of time may reflect an amount of a time interval in which the screen image may be obtained.

Figure 6:
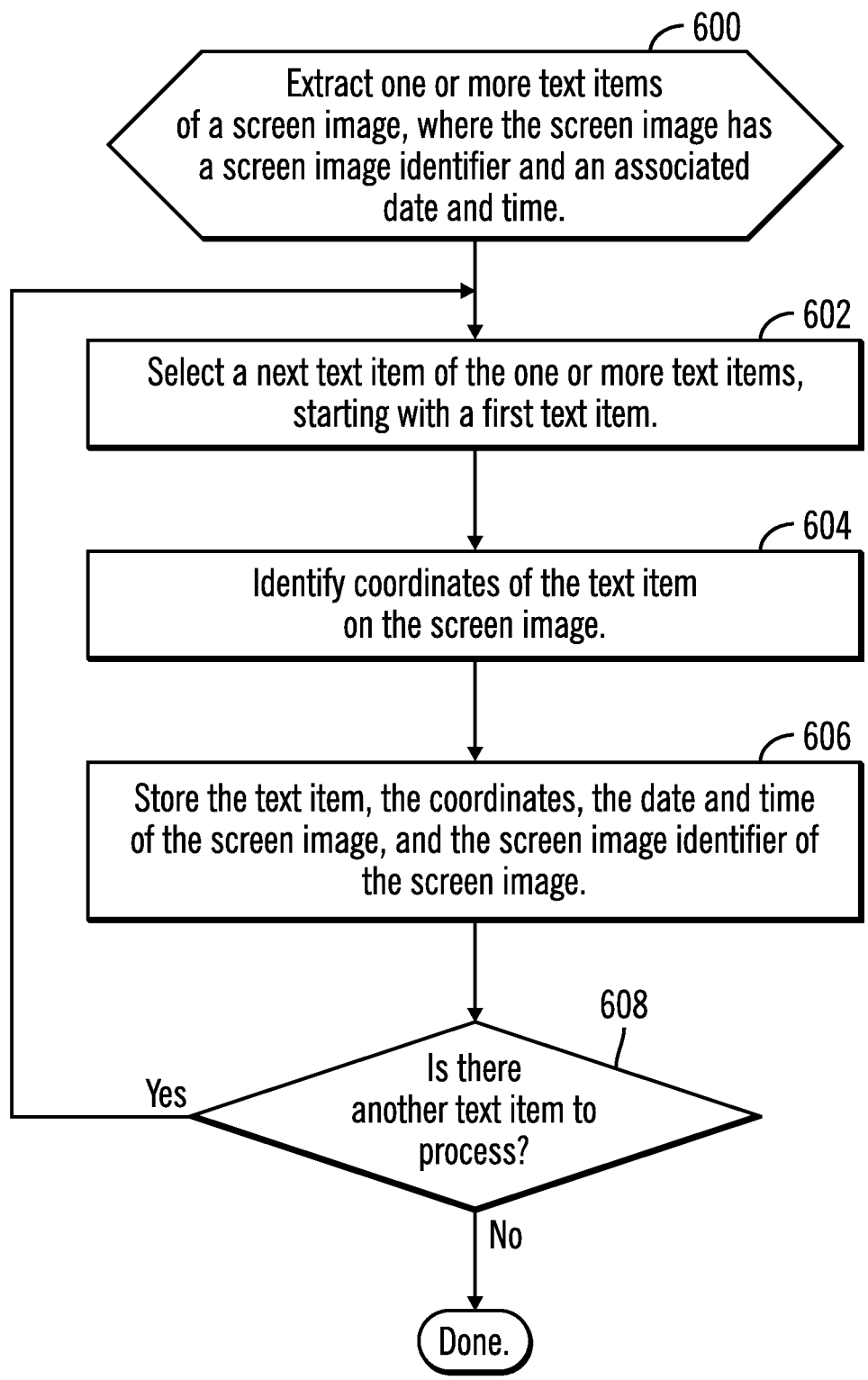
FIG. 6 illustrates, in a flowchart, operations for extracting and processing one or more text items in a screen image in accordance with certain embodiments.

FIG. 6 illustrates, in a flowchart, operations for extracting and processing one or more text items in a screen image in accordance with certain embodiments. The operations of FIG. 6 detail the processing of block 508. Control begins at block 600 with the positional engine 110 extracting one or more text items of a screen image, where the screen image has a screen image identifier and an associated date and time. In certain embodiments, the one or more text items are a set of words. In block 602, the positional engine 110 selects a next text item of the one or more text items, starting with a first text item. In block 604, the positional engine 110 identifies the coordinates of the text item on the screen image. In block 606, the positional engine 110 stores the text item, the coordinates, the date and time of the screen image, and the screen image identifier of the screen image in the database 170 and/or the database 190. In block 608, the positional engine 110 determines whether there is another text item to process. If so, processing continues to block 602 to select another text item, otherwise, processing is done.

Figure 7:
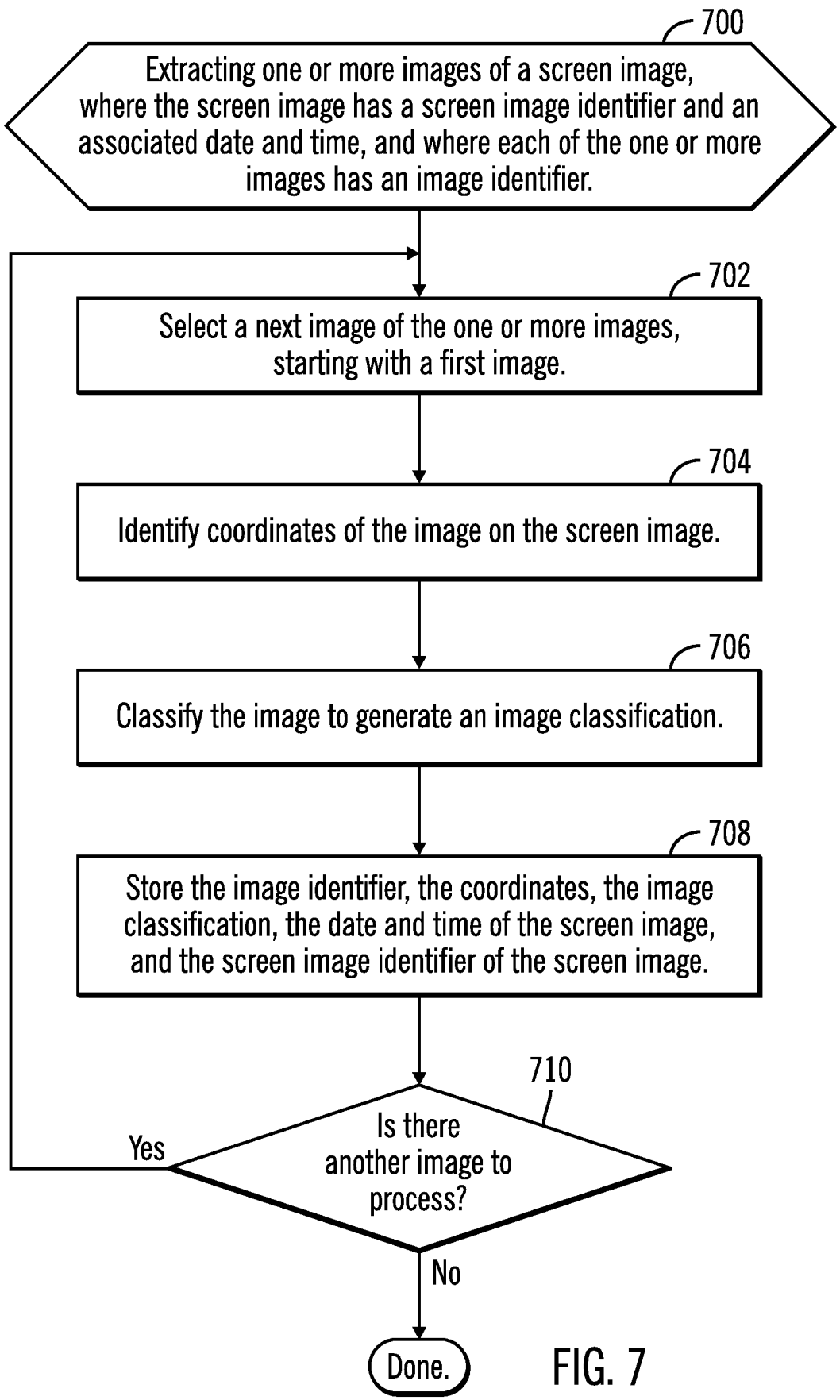
FIG. 7 illustrates, in a flowchart, operations for extracting and processing one or more images in a screen image in accordance with certain embodiments.

FIG. 7 illustrates, in a flowchart, operations for extracting and processing one or more images in a screen image in accordance with certain embodiments. The operations of FIG. 7 detail the processing of block 510. Control begins at block 700 with the positional engine 110 extracting one or more images of a screen image, where the screen image has a screen image identifier and an associated date and time. In block 702, the positional engine 110 selects a next image of the one or more images, starting with a first image. In block 704, the positional engine 110 identifies the coordinates of the image on the screen image. In block 706, the positional engine 110 classifies the image to generate an image classification. In certain embodiments, the positional engine 110 uses an image classifier (e.g., a machine learning model) to classify the image. Examples of the image classification are: person, animal, building, road, waterway, etc.

In block 708, the positional engine 110 stores the image, the coordinates, the image classification, the date and time of the screen image, and the screen image identifier of the screen image in the database 180 and/or the database 190. In block 710, the positional engine 110 determines whether there is another image to process. If so, processing continues to block 702 to select another image, otherwise, processing is done.

FIGS. 8A and 8B illustrate an example of storing position information for text items and an image in accordance with certain embodiments. In FIG. 8A, a screen image 810 includes the text items "Topic ABC" and "Memory" and includes an image for a photo of a person. The screen image 810 also has a date and time and a screen image identifier (SS-0001). The positional engine 110 extracts each of the text items, determines their coordinates, and stores this information in a database table 810. The positional engine 110 extracts the image, determines an image classification of "person", determines the coordinates, and stores this information in database table 820. Then, the positional engine 110 links the information for the text items and the image with the screen image date and time and the screen image identifier and stores the information in the database table 830, which is an example of a table in the positional database 190.

Once the position information of text items and images are stored, the positional engine 110 provides the GUI to allow a user to specify a range of positional information as a search parameter to search on the screen (e.g., by using a mouse, a finger, etc.). The positional engine 110 receives a type attribute via the GUI, where the type is another search parameter and specifies text item or image in the specified range. The positional engine 110 may receive input of a text item or an image classification as an additional search parameter. Also, the positional engine 110 may receive the date and time as yet another search parameter. Then, the positional engine 110 attempts to identify one or more screen images using the inputs from the user. The positional engine 110 displays thumbnails of any identified screen images as search results. Then, a user may select a thumbnail to view that screen image.

Figure 9A:
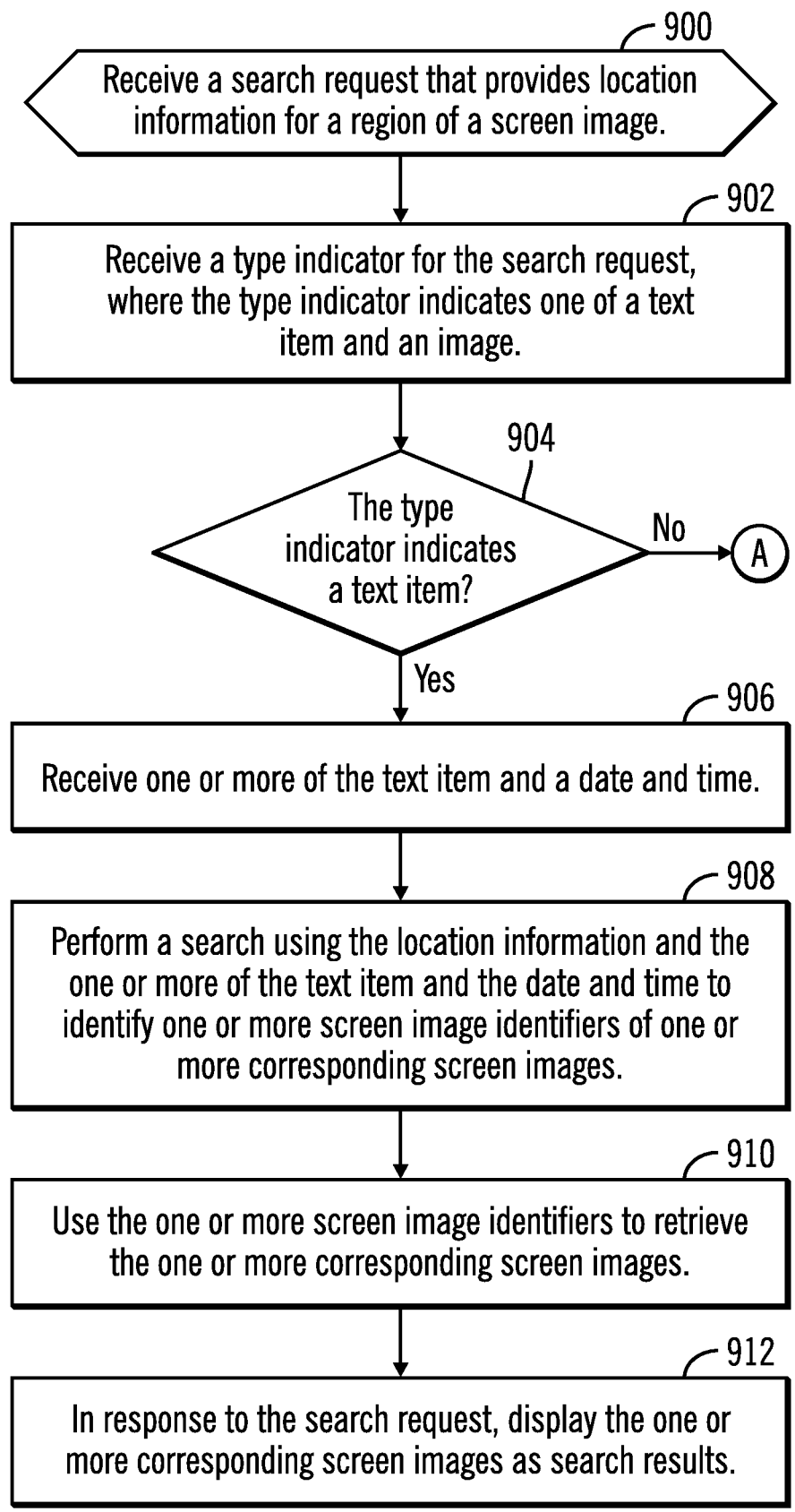
FIGS. 9A and 9B illustrate, in a flowchart, operations for performing a search with position information in accordance with certain embodiments.
Figure 9B:
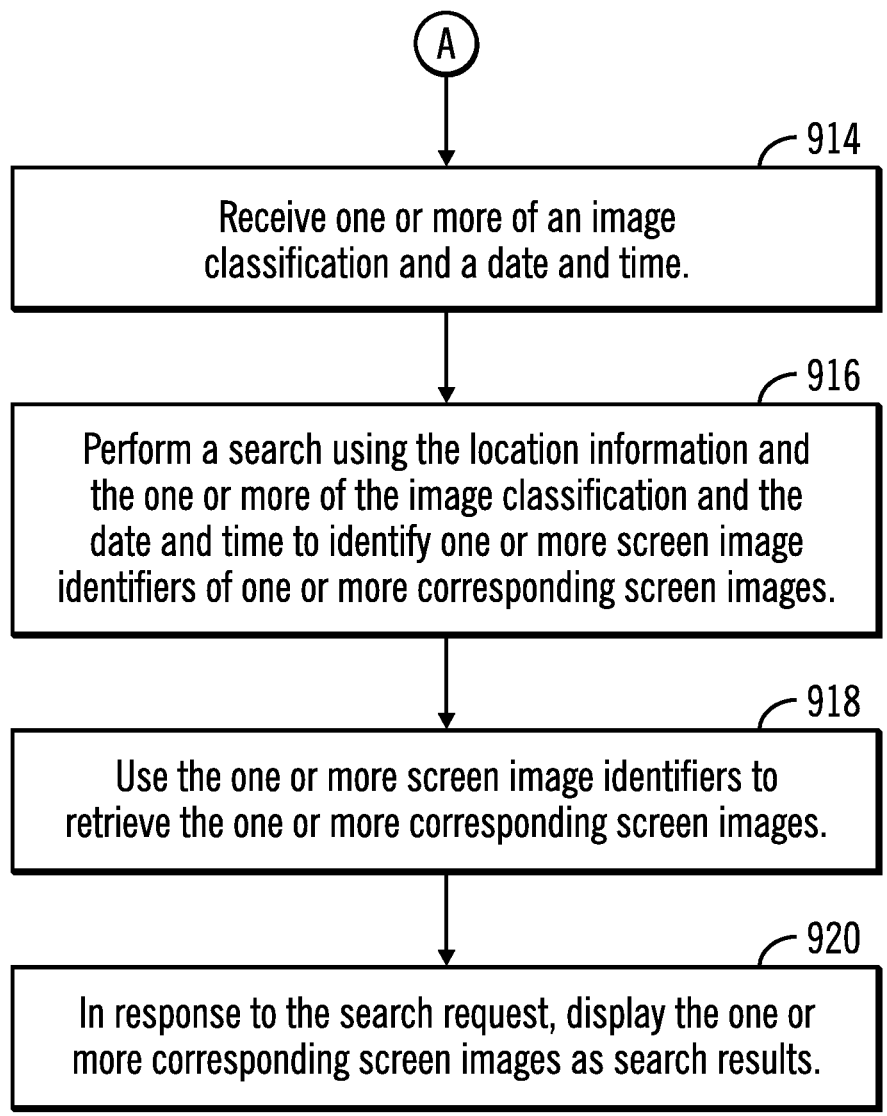

FIGS. 9A and 9B illustrate, in a flowchart, operations for performing a search with position information in accordance with certain embodiments. Control begins at block 900 with the positional engine 110 receiving a search request that provides location information for a region of a screen image. In certain embodiments, the search request is provided via the GUI with a user selecting the region by mouse, finger, etc. In other embodiments, the user may select the region by providing a description of the region (e.g., upper, left quarter). The region may be described as a range or portion of the screen image.

In block 902, the positional engine 110 receives a type indicator for the search request from a user, where the type indicator indicates one of a text item and an image. With this, the user indicates whether the user is searching for a text item or an image. In certain embodiments, the positional engine 110 provides a dropdown box in the GUI to allow the user to select the type indicator.

In block 904, the positional engine 110 determines whether the type indicator indicates a text item. If so, processing continues to block 906, otherwise, processing continues to block 914 (FIG. 9B). In block 906, the positional engine 110 receives one or more of the text item and a date and time. That is the user may provide input of the text item (e.g., "memory"), of a date and time, or both. In certain embodiments, the positional engine 110 provides a text box and a calendar-time box in the GUI to allow the user to provide the text item and/or the date and time.

In block 908, the positional engine 110 performs a search using the location information and the one or more of the text item and the date and time to identify one or more screen image identifiers of one or more corresponding screen images. In block 910, the positional engine 110 uses the one or more screen image identifiers to retrieve the one or more corresponding screen images. In block 912, in response to the search request, the positional engine 110 displays the one or more corresponding screen images as search results. In certain embodiments, the positional engine 110 provides the search results as thumbnails of the screen images, and, when a thumbnail is selected, the screen image for that thumbnail is displayed in full in the GUI. In other embodiments, the positional engine 110 provides the search results as a list of screen image identifiers for selection.

In block 914, the positional engine 110 receives one or more of an image classification and a date and time. That is the user may provide input of the image classification, of a date and time, or both. In certain embodiments, the positional engine 110 provides an image classification dropdown box and a calendar-time box in the GUI to allow the user to provide the image classification and/or the date and time.

In block 916, the positional engine 110 performs a search using the location information and the one or more of the image classification and the date and time to identify one or more screen image identifiers of one or more corresponding one or more screen images. In block 918, the positional engine 110 uses the one or more screen image identifiers to retrieve the one or more corresponding screen images. In block 920, in response to the search request, the positional engine 110 displays the one or more corresponding screen images as search results. In certain embodiments, the positional engine 110 provides the search results as thumbnails of the screen images, and, when a thumbnail is selected, the screen image for that thumbnail is displayed in full in the GUI. In other embodiments, the positional engine 110 provides the search results as a list of screen image identifiers for selection.

Figure 10:
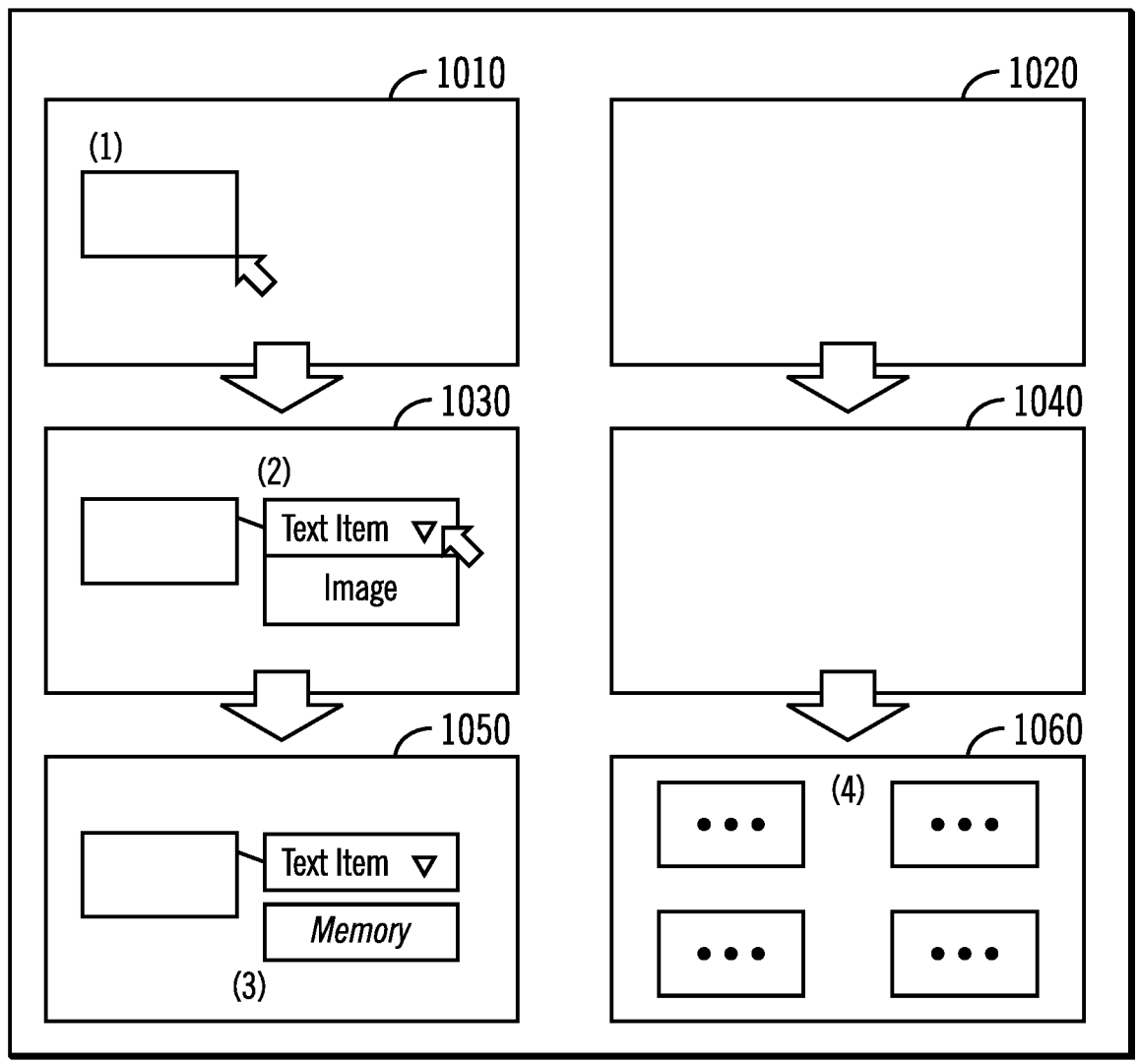
FIG. 10 illustrates an example text item search in accordance with certain embodiments.

FIG. 10 illustrates an example text item search in accordance with certain embodiments. In certain embodiments, the GUI displays an input portion (e.g., on the left-hand side) to allow a user to provide input for a search and displays an output portion (e.g., on the right-hand side) of any search results found for the input. In GUI 1010, the positional engine 110 has received user selection of a region. In this example, the user used a mouse or finger to select the rectangular region. However, in other embodiments circular or other shapes of regions may be selected. In GUI 1020, the positional engine 110 indicates that no search results have been found based on the region alone. In GUI 1030, the positional engine 110 has received user selection of the type indicator of text item. In this example, the user has used a dropdown to select text item for type indicator. In GUI 1040, the positional engine 110 indicates that no search results have been found based on the region and the type indicator of text item. In GUI 1050, the positional engine 110 has received user selection of a text item of "Memory". In this example, the user has input the text item "Memory" into the text item input field. After performing a search using the region and "Memory", the positional engine 110 displays, in GUI 1060, thumbnails of screen images containing the text item "Memory" in the region.

Figure 11:
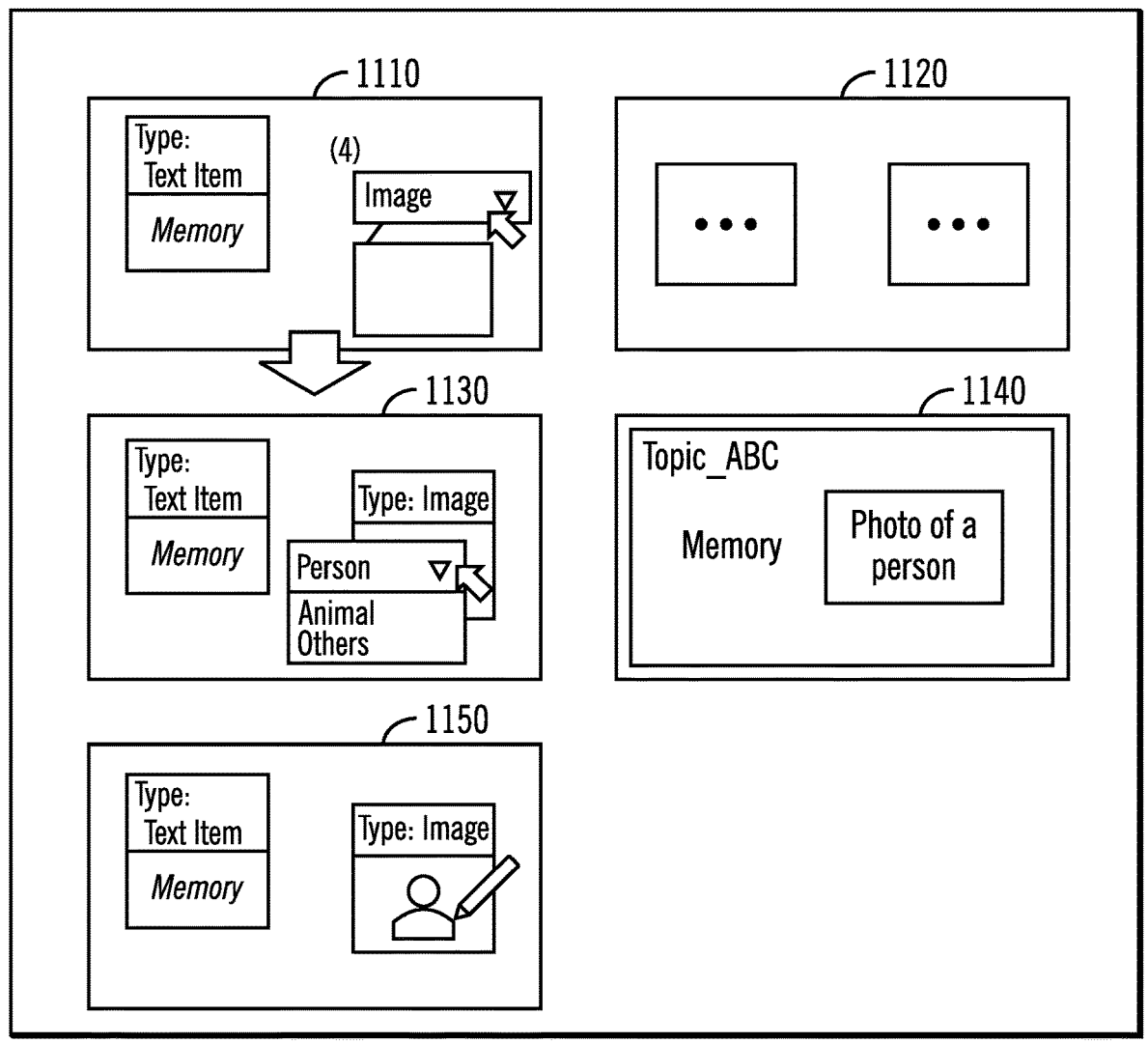
FIG. 11 illustrates an example image search in accordance with certain embodiments.

FIG. 11 illustrates an example image search in accordance with certain embodiments. In GUI 1110, the positional engine 110 has received user selection of a new region and of the type indicator of image. After performing a search using the region and the type indicator of image, the positional engine 110 displays, in GUI 1120, thumbnails of two screen images containing an image in the region. Each of these two screen images has an image in the region.

In GUI 1130, the positional engine 110 has received user selection of the image classification of "Person". In this example, the user has used a dropdown to select the image classification of "Person". In GUI 1140, the positional engine 110 displays the screen image of the two screen images (of GUI 1120) that includes an image of a person.

In alternative embodiments, a user may optionally provide a hand drawn image of a person, a photograph, etc. In GUI 1150, the positional engine 110 has received user input of a more specific image. In this example, the user has drawn the image by freehand. In certain embodiments, the user may specify metadata for the drawn image, where the metadata includes color, a number of entities (e.g., persons, animals, buildings, etc.).

In certain embodiments, the positional engine 110 obtains a screen image of an electronic terminal and stores the screen image with a screen image identifier generated for the screen image. The positional engine 110 collects character strings within the screen image and stores the character strings with coordinate information and the screen image identifier. The positional engine 110 collects images within the screen image and stores the images by classifying the images according to types using a pre-trained model and adding coordinate information and the screen image identifier. The positional engine 110 searches a screen image based on a user's specifying, as a region, a range for the user to search on a screen. The positional engine 110 receives input of a type indicator of character string or image in the region along with either the character string or an image classification. Then, the positional engine 110 searches for screen image identifiers of screen images in a database that have the desired character string or image classification in the region (i.e., based on coordinates of the character string or the image classification in the vicinity of the specified region). The positional engine 110 displays the screen images having the screen capture identifiers.

Using position information, the positional engine 110 allows for a search when a user remembers a location of desired information. For example, a user may use embodiments to perform a search based on memories, such as:

"I think I saw information about a treatment in a document displayed at the upper right of the screen."

"I saw an article about a computer at the left of a newspaper page on the screen."

I think I saw a photo at the lower right of the web page on the screen."

The positional engine 110 may be provided as part of a function of an application or incorporated into an operating system. The screen images may be obtained and stored at fixed time intervals or may be obtained and stored based on a change to the screen. Also, in certain embodiments, the whole screen may be captured or some part of the screen may be captured (e.g., where a change was detected).

In certain embodiments, the positional engine 110 stores a subset of the text items. This avoids saving all text items and saves on storage and other computing resources. For example, the positional engine 110 may determine the term frequency-inverse document frequency of each of the text items and stores those text items that are more frequently used. resources. As another example, the positional engine 110 may determine that a text item that is included in a dictionary or other source may be stored. As yet another example, the positional engine 110 may store text items that are not found in a dictionary or other source.

In certain embodiments, the text items for a web page are found by crawling web sites, rather than using optical character recognition.

In certain embodiments, the positional engine 110 selectively does not include certain items in the screen image, such as the toolbar or certain icons, that are commonly displayed or may set a priority for such items to determine whether to include them in the screen image. This is done to save in storage.

Embodiments may be used for capturing any screens. For example, embodiments are applicable to electronic medical charts (e.g., where information is entered electronically or where a paper medical chart is scanned and stored as an image). In such an example, doctors are able to search the electronic medical charts based on their memory (e.g., of the paper medical chart).

Unlike conventional techniques that search a subject from documents stored in a data source such as a database, embodiments search the subject from documents that a user has seen displayed in the GUI by allowing the user to specify position information on the screen as a search condition.

Unlike conventional techniques that search based on text, metadata or text linked to an image that requires the user to know about a relevant word or image (input) to perform the search, embodiments provide a search based on an input of position information on the screen. Embodiments may be used with conventional techniques to enhance search accuracy by further using metadata or text as a supplementary input.

Figure 12:
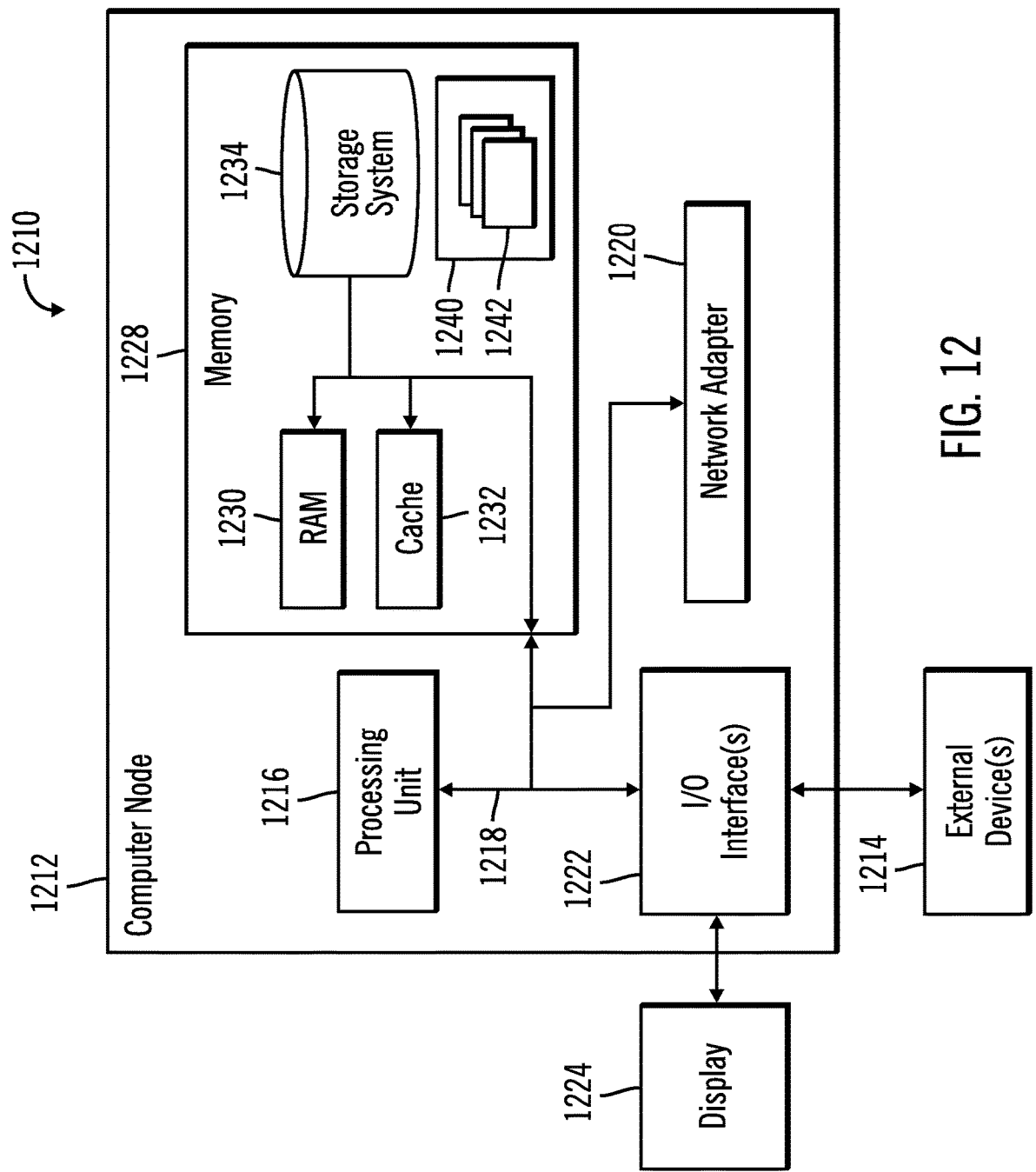
FIG. 12 illustrates a computing node in accordance with certain embodiments.

FIG. 12 illustrates a computing environment 1210 in accordance with certain embodiments. In certain embodiments, the computing environment is a cloud computing environment. Referring to FIG. 12, computer node 1212 is only one example of a suitable computing node and is not intended to suggest any limitation as to the scope of use or functionality of embodiments of the invention described herein. Regardless, computer node 1212 is capable of being implemented and/or performing any of the functionality set forth hereinabove.

The computer node 1212 may be a computer system, which is operational with numerous other general purpose or special purpose computing system environments or configurations. Examples of well-known computing systems, environments, and/or configurations that may be suitable for use with computer node 1212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1212 may be described in the general context of computer system executable instructions, such as program modules, being executed by a computer system. Generally, program modules may include routines, programs, objects, components, logic, data structures, and so on that perform particular tasks or implement particular abstract data types. Computer node 1212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer node 1212 is shown in the form of a general-purpose computing device. The components of computer node 1212 may include, but are not limited to, one or more processors or processing units 1216, a system memory 1228, and a bus 1218 that couples various system components including system memory 1228 to one or more processors or processing units 1216.

Bus 1218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1212 typically includes a variety of computer system readable media. Such media may be any available media that is accessible by computer node 1212, and it includes both volatile and non-volatile media, removable and non-removable media.

System memory 1228 can include computer system readable media in the form of volatile memory, such as random access memory (RAM) 1230 and/or cache memory 1232. Computer node 1212 may further include other removable/non-removable, volatile/non-volatile computer system storage media. By way of example only, storage system 1234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1218 by one or more data media interfaces. As will be further depicted and described below, system memory 1228 may include at least one program product having a set (e.g., at least one) of program modules that are configured to carry out the functions of embodiments of the invention.

Program/utility 1240, having a set (at least one) of program modules 1242, may be stored in system memory 1228 by way of example, and not limitation, as well as an operating system, one or more application programs, other program modules, and program data. Each of the operating system, one or more application programs, other program modules, and program data or some combination thereof, may include an implementation of a networking environment. Program modules 1242 generally carry out the functions and/or methodologies of embodiments of the invention as described herein.

Computer node 1212 may also communicate with one or more external devices 1214 such as a keyboard, a pointing device, a display 1224, etc.; one or more devices that enable a user to interact with computer node 1212; and/or any devices (e.g., network card, modem, etc.) that enable computer node 1212 to communicate with one or more other computing devices. Such communication can occur via Input/Output (I/O) interfaces 1222. Still yet, computer node 1212 can communicate with one or more networks such as a local area network (LAN), a general wide area network (WAN), and/or a public network (e.g., the Internet) via network adapter 1220. As depicted, network adapter 1220 communicates with the other components of computer node 1212 via bus 1218. It should be understood that although not shown, other hardware and/or software components could be used in conjunction with computer node 1212. Examples, include, but are not limited to: microcode, device drivers, redundant processing units, external disk drive arrays, RAID systems, tape drives, and data archival storage systems, etc.

In certain embodiments, the computing device 100 has the architecture of computer node 1212. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
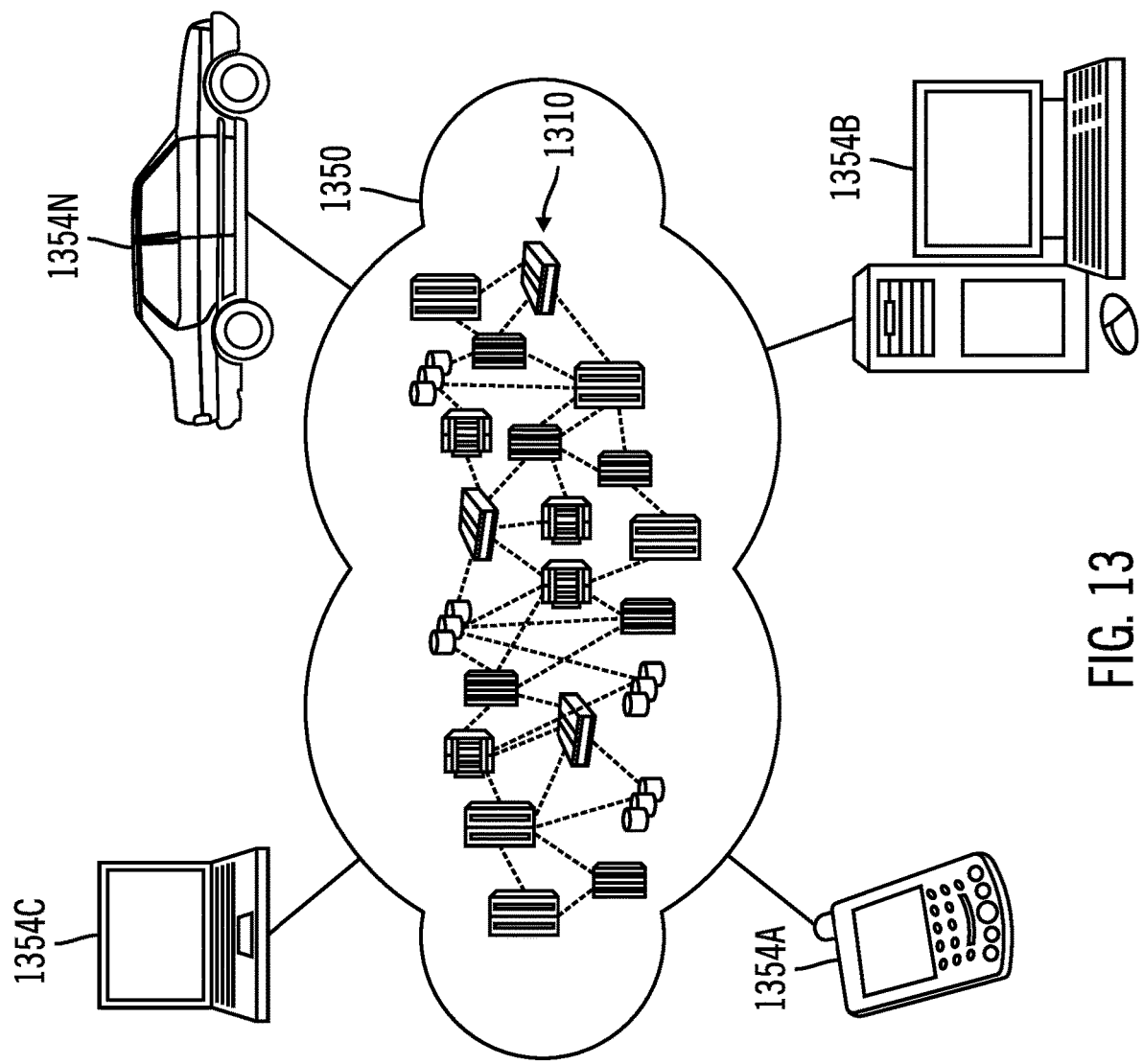
FIG. 13 illustrates a cloud computing environment in accordance with certain embodiments.

Referring now to FIG. 13, illustrative cloud computing environment 1320 is depicted. As shown, cloud computing environment 1320 includes one or more cloud computing nodes 1310 with which local computing devices used by cloud consumers, such as, for example, personal digital assistant (PDA) or cellular telephone 1354A, desktop computer 1354B, laptop computer 1354C, and/or automobile computer system 1354N may communicate. Nodes 1310 may communicate with one another. They may be grouped (not shown) physically or virtually, in one or more networks, such as Private, Community, Public, or Hybrid clouds as described hereinabove, or a combination thereof. This allows cloud computing environment 1320 to offer infrastructure, platforms and/or software as services for which a cloud consumer does not need to maintain resources on a local computing device. It is understood that the types of computing devices 1354A-N shown in FIG. 13 are intended to be illustrative only and that computing nodes 1310 and cloud computing environment 1320 can communicate with any type of computerized device over any type of network and/or network addressable connection (e.g., using a web browser).

Figure 14:
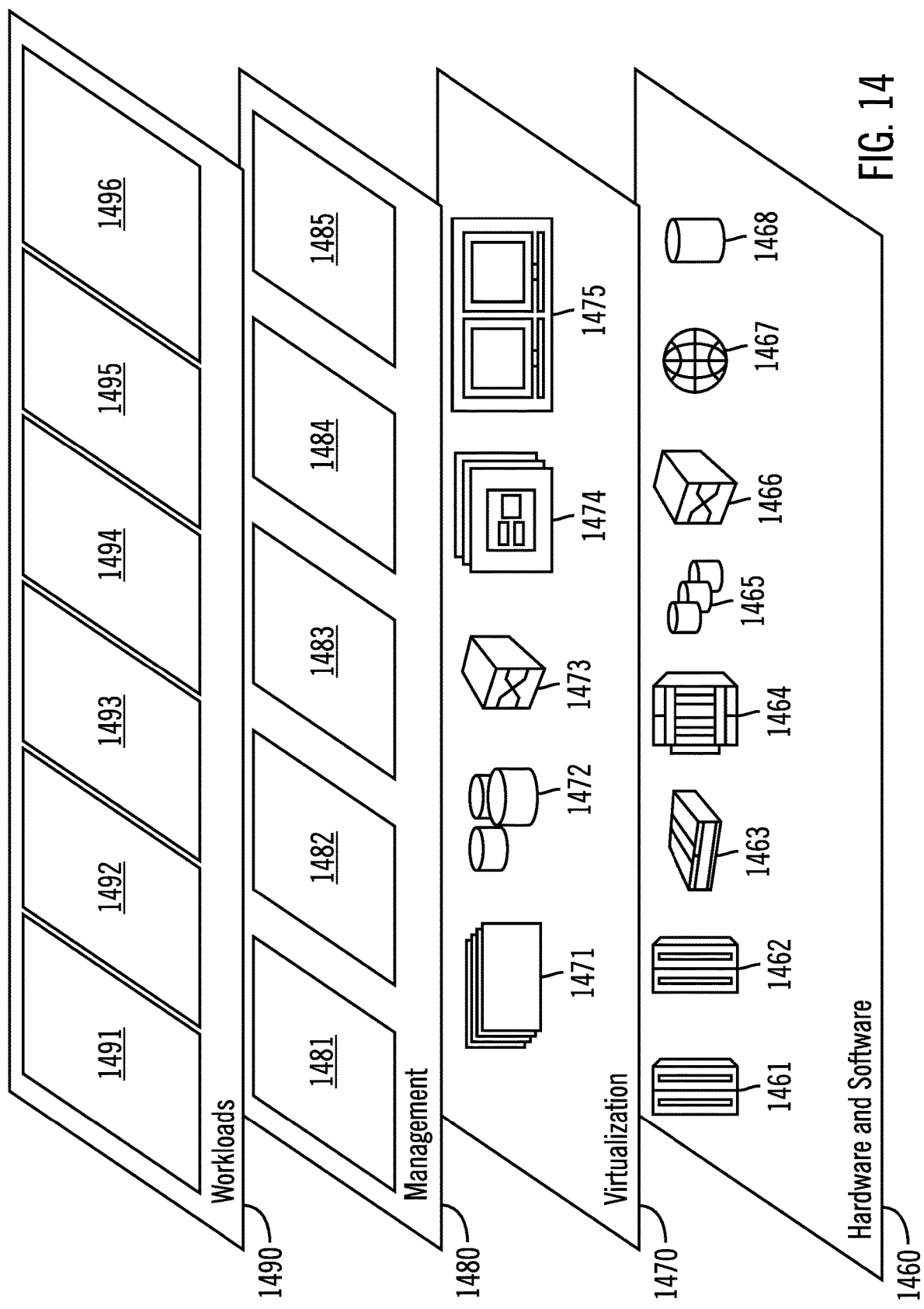
FIG. 14 illustrates abstraction model layers in accordance with certain embodiments.

Referring now to FIG. 14, a set of functional abstraction layers provided by cloud computing environment 1320 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 1460 includes hardware and software components. Examples of hardware components include: mainframes 1461; RISC (Reduced Instruction Set Computer) architecture based servers 1462; servers 1463; blade servers 1464; storage devices 1465; and networks and networking components 1466. In some embodiments, software components include network application server software 1467 and database software 1468.

Virtualization layer 1470 provides an abstraction layer from which the following examples of virtual entities may be provided: virtual servers 1471; virtual storage 1472; virtual networks 1473, including virtual private networks; virtual applications and operating systems 1474; and virtual clients 1475.

In one example, management layer 1480 may provide the functions described below. Resource provisioning 1481 provides dynamic procurement of computing resources and other resources that are utilized to perform tasks within the cloud computing environment. Metering and Pricing 1482 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1483 provides access to the cloud computing environment for consumers and system administrators. Service level management 1484 provides cloud computing resource allocation and management such that required service levels are met. Service Level Agreement (SLA) planning and fulfillment 1485 provide pre-arrangement for, and procurement of, cloud computing resources for which a future requirement is anticipated in accordance with an SLA.

Workloads layer 1490 provides examples of functionality for which the cloud computing environment may be utilized. Examples of workloads and functions which may be provided from this layer include: mapping and navigation 1491; software development and lifecycle management 1492; virtual classroom education delivery 1493; data analytics processing 1494; transaction processing 1495; and performing a search based on position information 1496.

Thus, in certain embodiments, software or a program, implementing performing a search based on position information in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
    receiving a search request that provides location information for a region of a screen image;
    receiving a selection of a type indicator, wherein the type indicator indicates one of a text item and an image;
    in response to the type indicator indicating the text item, receiving one or more of the text item and a date and time;
    performing a search using the location information and the one or more of the text item and the date and time to identify one or more screen image identifiers of one or more corresponding screen images of a plurality of screen images;
    using the one or more screen image identifiers to retrieve the one or more corresponding screen images; and
    displaying the one or more corresponding screen images as search results.

2. The computer-implemented method of claim 1, wherein the search is performed by matching coordinates of the region with coordinates in a database that are associated with the text item.

3. The computer-implemented method of claim 1, wherein the operations further comprise:
    in response to the type indicator indicating the image,
        receiving one or more of an image classification and another date and time; and
        performing a new search using the location information and the one or more of the image classification and the another date and time to identify one or more additional screen image identifiers of one or more corresponding screen images.

4. The computer-implemented method of claim 3, wherein the new search is performed by matching coordinates of the region with coordinates in a database that are associated with the image classification.

5. The computer-implemented method of claim 1, wherein the operations further comprise:
    obtaining the plurality of screen images by periodically capturing each of the screen images, wherein each of the screen images has an associated date and time and a screen image identifier.

6. The computer-implemented method of claim 5, wherein the operations further comprise:
    identifying a text item for a screen image of the plurality of screen images; and
    storing the text item with coordinates of the text item on the screen image, with a date and time of the screen image, and with a screen image identifier of the screen image.

7. The computer-implemented method of claim 5, wherein the operations further comprise:
    identifying an image for a screen image of the plurality of screen images;
    classifying the image to determine an image classification; and
    storing the image with coordinates of the image on the screen image, with the image classification, with a date and time of the screen image, and with a screen image identifier of the screen image.

8. The computer-implemented method of claim 1, wherein a Software as a Service (SaaS) is configured to perform the operations of the method.

9. A computer program product, the computer program product comprising a computer readable storage medium having program code embodied therewith, the program code executable by at least one processor to perform operations for:
    receiving a search request that provides location information for a region of a screen image;
    receiving a selection of a type indicator, wherein the type indicator indicates one of a text item and an image;
    in response to the type indicator indicating the text item, receiving one or more of the text item and a date and time;

performing a search using the location information and the one or more of the text item and the date and time to identify one or more screen image identifiers of one or more corresponding screen images of a plurality of screen images;

using the one or more screen image identifiers to retrieve the one or more corresponding screen images; and displaying the one or more corresponding screen images as search results.

10. The computer program product of claim 9, wherein the search is performed by matching coordinates of the region with coordinates in a database that are associated with the text item.

11. The computer program product of claim 9, wherein the program code is executable by the at least one processor to perform operations for:

in response to the type indicator indicating the image,
receiving one or more of an image classification and another date and time; and
performing a new search using the location information and the one or more of the image classification and the another date and time to identify one or more additional screen image identifiers of one or more corresponding screen images.

12. The computer program product of claim 11, wherein the new search is performed by matching coordinates of the region with coordinates in a database that are associated with the image classification.

13. The computer program product of claim 9, wherein the program code is executable by the at least one processor to perform operations for:

obtaining the plurality of screen images by periodically capturing each of the screen images, wherein each of the screen images has an associated date and time and a screen image identifier.

14. The computer program product of claim 13, wherein the program code is executable by the at least one processor to perform operations for:

identifying a text item for a screen image of the plurality of screen images; and
storing the text item with coordinates of the text item on the screen image, with a date and time of the screen image, and with a screen image identifier of the screen image.

15. The computer program product of claim 13, wherein the program code is executable by the at least one processor to perform operations for:

identifying an image for a screen image of the plurality of screen images;
classifying the image to determine an image classification; and
storing the image with coordinates of the image on the screen image, with the image classification, with a date and time of the screen image, and with a screen image identifier of the screen image.

16. The computer program product of claim 9, wherein a Software as a Service (SaaS) is configured to perform the operations of the computer program product.

17. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
receiving a search request that provides location information for a region of a screen image;
receiving a selection of a type indicator, wherein the type indicator indicates one of a text item and an image;
in response to the type indicator indicating the text item,
receiving one or more of the text item and a date and time;
performing a search using the location information and the one or more of the text item and the date and time to identify one or more screen image identifiers of one or more corresponding screen images of a plurality of screen images;
using the one or more screen image identifiers to retrieve the one or more corresponding screen images; and
displaying the one or more corresponding screen images as search results.

18. The computer system of claim 17, wherein the search is performed by matching coordinates of the region with coordinates in a database that are associated with the text item.

19. The computer system of claim 17, wherein the operations further comprise:

in response to the type indicator indicating the image,
receiving one or more of an image classification and another date and time; and
performing a new search using the location information and the one or more of the image classification and the another date and time to identify one or more additional screen image identifiers of one or more corresponding screen images.

20. The computer system of claim 19, wherein the new search is performed by matching coordinates of the region with coordinates in a database that are associated with the image classification.

21. The computer system of claim 17, wherein the operations further comprise:

obtaining the plurality of screen images by periodically capturing each of the screen images, wherein each of the screen images has an associated date and time and a screen image identifier.

22. The computer system of claim 21, wherein the operations further comprise:

identifying a text item for a screen image of the plurality of screen images; and
storing the text item with coordinates of the text item on the screen image, with a date and time of the screen image, and with a screen image identifier of the screen image.

23. The computer system of claim 21, wherein the operations further comprise:

identifying an image for a screen image of the plurality of screen images;
classifying the image to determine an image classification; and
storing the image with coordinates of the image on the screen image, with the image classification, with a date and time of the screen image, and with a screen image identifier of the screen image.

24. The computer system of claim 17, wherein a Software as a Service (SaaS) is configured to perform the operations of the computer system.

\* \* \* \* \*